United States Patent
Tillmann

(10) Patent No.: US 9,811,082 B2
(45) Date of Patent: Nov. 7, 2017

(54) AERIAL IMAGE COLLECTION

(71) Applicant: HERE Global B.V., Veldhoven (NL)

(72) Inventor: Marco Tillmann, Niddatal (DE)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/195,123

(22) Filed: Jun. 28, 2016

(65) Prior Publication Data

US 2016/0306354 A1    Oct. 20, 2016

Related U.S. Application Data

(63) Continuation of application No. 13/785,796, filed on Mar. 5, 2013, now Pat. No. 9,429,425.

(51) Int. Cl.
| | |
|---|---|
| *G05D 1/00* | (2006.01) |
| *G06T 17/00* | (2006.01) |
| *G01C 11/02* | (2006.01) |
| *G01C 11/06* | (2006.01) |
| *B64C 39/02* | (2006.01) |
| *G01C 11/08* | (2006.01) |

(52) U.S. Cl.
CPC ......... *G05D 1/0022* (2013.01); *B64C 39/024* (2013.01); *G01C 11/02* (2013.01); *G01C 11/06* (2013.01); *G01C 11/08* (2013.01); *B64C 2201/024* (2013.01); *B64C 2201/123* (2013.01); *B64C 2201/146* (2013.01); *G06T 17/00* (2013.01)

(58) Field of Classification Search
CPC .............. G07C 5/008; G07C 9/00309; G07C 2009/00793; B60R 25/24; F02N 11/0807
See application file for complete search history.

(56) References Cited

U.S. PATENT DOCUMENTS

| | | |
|---|---|---|
| 2008/0158256 A1 | 7/2008 | Russell et al. |
| 2008/0221843 A1* | 9/2008 | Shenkar .................. G06T 17/05 703/1 |
| 2010/0231705 A1 | 9/2010 | Yahav et al. |

(Continued)

OTHER PUBLICATIONS

Bénitez, Sébastien, and Caroline Baillard. "Automated selection of terrestrial images from sequences for the texture -napping of 3D city models." CMRT09. IAPRS 38.Part 3 W4 (2009).

(Continued)

*Primary Examiner* — Jelani Smith
(74) *Attorney, Agent, or Firm* — Lempia Summerfield Katz LLC

(57) ABSTRACT

In one embodiment, an aerial collection system includes an image collection field vehicle that travels at street level and an image collection aerial vehicle that travels in the air above the street. The aerial vehicle collects image data including at least a portion of the field vehicle. The field vehicle includes a marker, which is identified from the collected image data. The marker is analyzed to determine an operating characteristic of the aerial vehicle. In one example, the operating characteristic in the marker includes information for a flight instruction for the aerial vehicle. In another example, the operating characteristic in the marker includes information for the three dimensional relationship between the vehicles. The three dimensional relationship is used to combine images collected from the air and images collected from the street level.

18 Claims, 9 Drawing Sheets

(56) References Cited

U.S. PATENT DOCUMENTS

| | | |
|---|---|---|
| 2011/0074953 A1 | 3/2011 | Rauscher et al. |
| 2011/0148866 A1* | 6/2011 | Chu .................. G06T 15/04 345/419 |
| 2012/0237083 A1 | 9/2012 | Lange et al. |
| 2014/0093127 A1 | 4/2014 | Mundhenk et al. |
| 2014/0098990 A1 | 4/2014 | Vian et al. |
| 2014/0316614 A1 | 10/2014 | Newman |

OTHER PUBLICATIONS

Bénitez, Sébastien, Eloïse Denis, and Caroline Baillard. "Automatic production of occlusion-free rectified facade textures using vehicle-based imagery." IAPRS/PCV A 38 (2010): 275-280.

Karl Engelbert Wenzel, Automatic Take Off, Tracking and Landing of a Miniature UAV on a Moving Carrier Vehicle, Published online Oct. 23, 2010.

Tahar, Khairul Nizam, et al. "Unmanned aerial vehicle technology for large scale mapping." International Symposium & Exhibition on Geoinformation (ISG), 2011.

* cited by examiner

AERIAL IMAGE COLLECTION

This application is a continuation application under 37 C.F.R. §1.53(b) and 35 U.S.C. §120 of U.S. patent application Ser. No. 13/785,796 (now U.S. Pat. No. 9,429,425) filed Mar. 5, 2013, the disclosure of which is incorporated herein by reference in its entirety.

FIELD

The following disclosure relates to image collection from an aerial vehicle, or more particularly, an analysis of a relationship between a field vehicle and image collection from an aerial vehicle.

BACKGROUND

Road level imagery may be collected using video cameras in a vehicle. Road level imagery provides adequate images of building facades around eye level or the level of the video cameras in the vehicle. However, larger buildings cannot be adequately imaged from vehicle-mounted cameras. Also, vegetation, road signs, or other obstacles may occlude building facades from the view of vehicle-mounted cameras.

Aerial photography from satellites and airplanes provide another view. Satellites orbit hundreds of miles to thousands of miles above the surface of the Earth and can provide only low detail images of wide geographic areas. Airplanes fly a minimum of four hundred feet above the surface of the Earth and also provide relatively low detail images. Airplanes are also incapable of adequately collecting images of the sides of buildings because of the angle of the line of sight. Images may be manually collected by static cameras as an operator moves along the road facade carefully ensuring that the road level imagery is adequately collected. However, this technique is too labor intensive. Another type of imagery collection is needed to provide the level of detail available in images collected by vehicle mounted cameras but from another perspective.

SUMMARY

In one embodiment, an aerial collection system includes an image collection field vehicle that travels at street level and an image collection aerial vehicle that travels in the air above the street. The aerial vehicle collects image data including at least a portion of the field vehicle. The field vehicle includes a marker, which is identified from the collected image data. The marker is analyzed to determine an operating characteristic of the aerial vehicle. In one example, the operating characteristic in the marker includes information for a flight instruction for the aerial vehicle. In another example, the operating characteristic in the marker includes information for the three dimensional relationship between the vehicles. The three dimensional relationship is used to combine images collected from the air and images collected from the street level.

BRIEF DESCRIPTION OF THE DRAWINGS

Exemplary embodiments of the present invention are described herein with reference to the following drawings.

DETAILED DESCRIPTION

Street side imagery is collected by field vehicles equipped with cameras. The imagery is limited by the range of the cameras. For example, some portions of the building may be blocked by shrubs, trees, parked cars, people, or other objects between the field vehicle and the building facade. Also, high portions of the building facade may be out of range or out of the field of view of vehicle mounted cameras. An aerial vehicle may be used in cooperation with the field vehicle. The aerial vehicle may include a camera with a field of view that overlaps or otherwise supplements the camera in the vehicle. The aerial vehicle may track a field vehicle and follow the field vehicle. The image data collected by the aerial vehicle may be combined with the image data collected by the field vehicle. The aerial vehicle may be an autonomous vehicle such as an unmanned aerial vehicle (UAV). The aerial vehicle may be radio controlled helicopter (e.g., quadcopter or other helicopter).

The tracking of the field vehicle may utilize a marker on the top or the side of the field vehicle. The marker may be an augmented reality marker. The aerial vehicle includes a camera or other image detection device configured to detect the marker. The marker may provide a path or target for the aerial vehicle to follow. The marker may provide an instruction for the flight operation of the aerial vehicle. For example, the marker may define a distance from the field vehicle to the aerial vehicle or a speed of the aerial vehicle.

The combination of the image data of the aerial vehicle with the image data collected by the field vehicle to create a single image or related images may also use information stored in the marker. The image data for the marker collected by the aerial vehicle may be analyzed to identify a size and/or orientation of the marker. The size of the marker relates to the distance between the field vehicle and the aerial vehicle. The relative proportions and orientation of the marker relates to the angle between the field vehicle and the aerial vehicle. Therefore, the spatial relationship between the aerial vehicle and the field vehicle may be calculated from the marker. The image data of the aerial vehicle and the image data of the field vehicle may be combined according to the spatial relationship.

Figure 1:
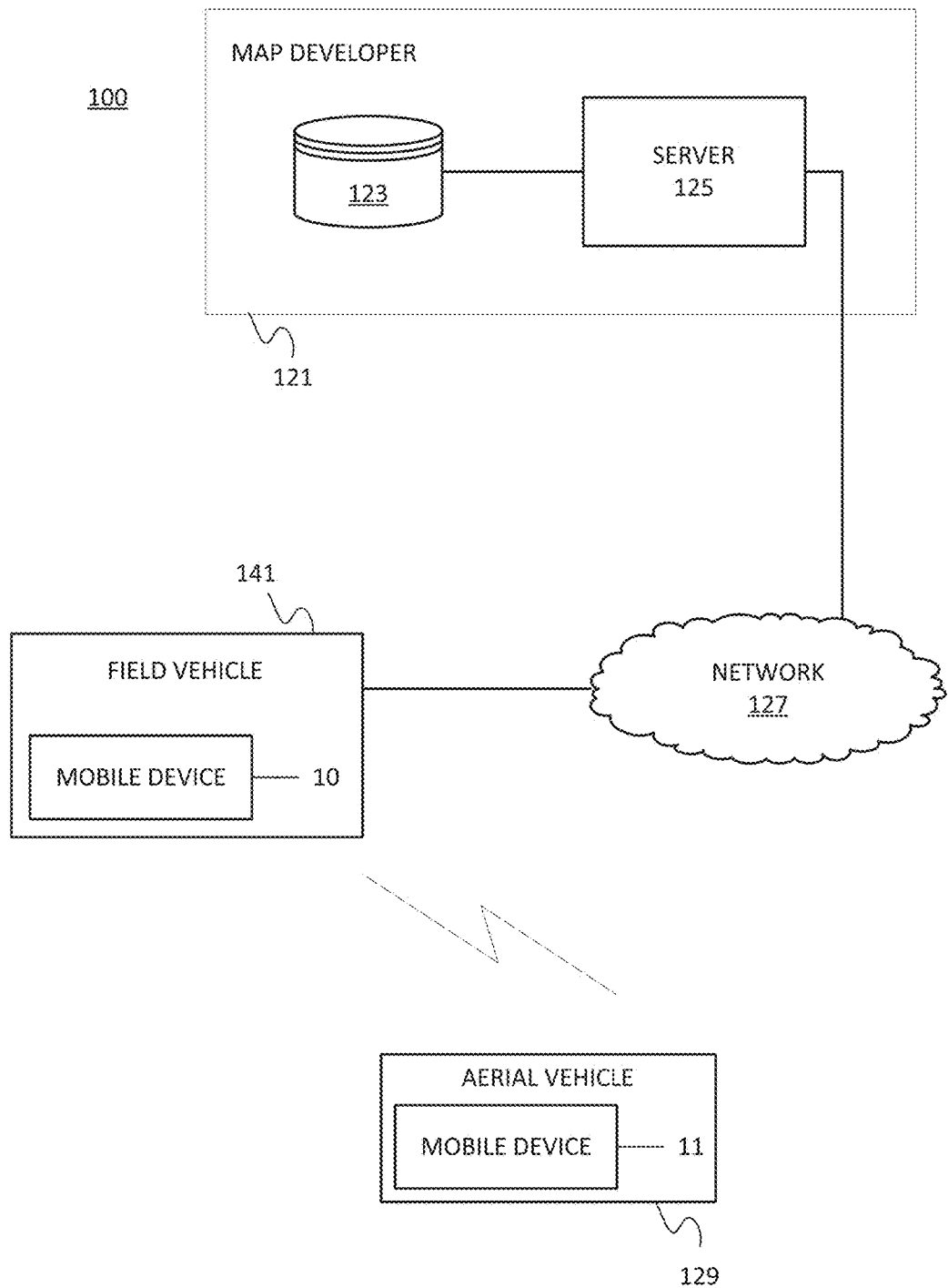
FIG. 1 illustrates an example system for aerial image collection.

FIG. 1 illustrates an exemplary system 100 for collecting and generating street side imagery. The system 100 includes a developer system 121, a field vehicle 141, an aerial vehicle 129, and optionally, a network 127. Additional, different, or fewer components may be provided. The developer system 121 includes a server 125 and a database 123. The developer system 121 may include computer systems and networks of a system operator (e.g., NAVTEQ or Nokia Corp.). The field vehicle 141 includes a terrestrial mobile device 10 and the aerial vehicle 129 includes an aerial mobile device 11.

The server 125 or the aerial mobile device 11 may receive image data of the field vehicle 141 that is collected by the aerial vehicle 129. The marker from the field vehicle 141 is identified from the image data and analyzed to determine an operating characteristic of the aerial vehicle 129. The marker may be an augmented reality code or a quick response (QR) code. The analysis of the marker may allow the aerial vehicle 129 to follow an appropriate flight path. For example, the mobile device 11 of the aerial vehicle 129 may compare subsequent images of the marker to determine the direction of travel of the field vehicle 141. The analysis of the marker may allow the image data collected by the aerial vehicle 129 to be combined with another image. For example, the mobile device 11 or the server 125 may align images from the aerial vehicle 129 and images from the field vehicle 141 according to the orientation of the marker.

The mobile devices 10 and 11 may include a data collection component and a data processing component. The data collection component may include one or any combination of a camera, a light distance and ranging (LIDAR) device, an inertial measurement unit (IMU), and a global positioning system (GPS). The data processing component includes a computer for processing data collected by the data collection component. The mobile devices 10 and 11 may be a smart phone, a mobile phone, a personal digital assistant (PDA), a tablet computer, a notebook computer, a personal navigation device (PND), a portable navigation device, and/or any other known or later developed portable or mobile computing device including or coupled to a camera. The camera may include an array of cameras pointing in multiple directions. The array of camera may include 2 to 8 cameras for each side as well as one or more cameras angled up and/or down.

The developer system 121 and the mobile devices 10 and 11 are coupled with the network 127. The phrase "coupled with" is defined to mean directly connected to or indirectly connected through one or more intermediate components. Such intermediate components may include hardware and/or software-based components.

The computing resources may be divided between the server 125 and either of the mobile devices 10 and 11. In some embodiments, the server 125 performs a majority of the processing. In other embodiments, the mobile device 10 or 11 performs a majority of the processing. In addition, the processing is divided substantially evenly between the server 125 and the mobile device 10 or 11. In another embodiment, the mobile devices 10 and 11 operation without connection to the server 125 other than for storage of image data.

Figure 2:
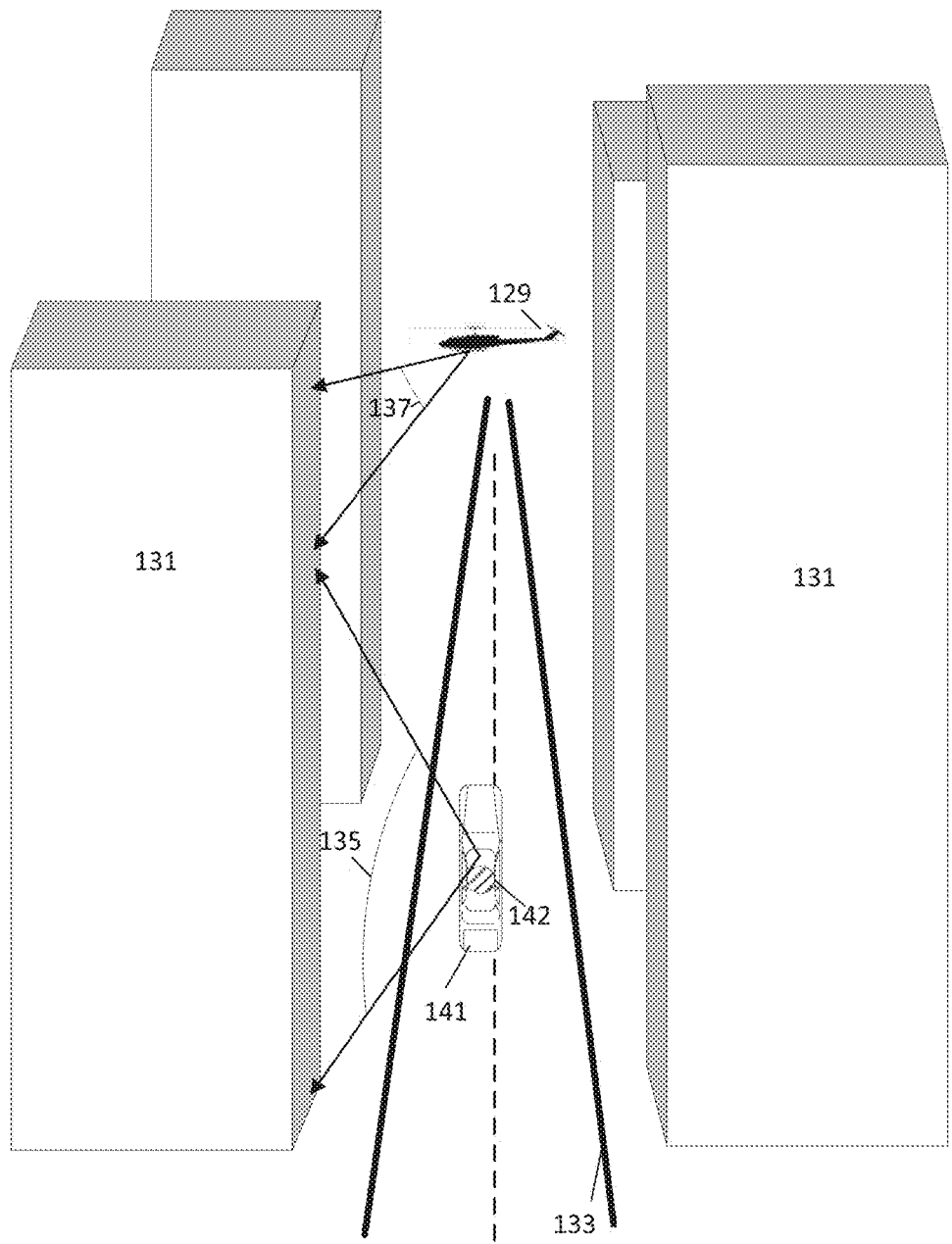
FIG. 2 illustrates an example guidance system for aerial image collection.

FIG. 2 illustrates an example guidance system for aerial image collection. The guidance system includes an aerial vehicle 129 and a terrestrial vehicle (e.g., field vehicle 141). The terrestrial vehicle 141 may include a marker 142. The terrestrial vehicle 141 may be an automobile traveling along the road 133 and include data collection equipment. The data collection equipment may include one or any combination of an array of cameras, an inertial measurement unit (IMU), and a global positioning system (GPS).

The building facade 131 and other objects are imaged by cameras coupled to mobile device 10 and 11 in the aerial vehicle 129 and the terrestrial vehicle 141. In one example, one or more cameras in the aerial vehicle 129 have an aerial field of view 137 and one or more cameras in the terrestrial vehicle 141 have a ground field of view 135. The aerial field of view 137 and the ground field of view 135 may overlap or be adjacent to one another. Either or both of the aerial field of view 137 and the ground field of view 135 may be applied to both sides of road 133. In addition, panoramic cameras or wide angle cameras may be used. A panoramic camera may be any camera having a field of view wider than that of the human eye (e.g., greater than 80 degrees). A 360 degree camera may also be used.

The mobile device 10 may control the overlap and/or intersection of the aerial field of view 137 and the ground field of view 135. The mobile device 10 may generate a command for the one or more cameras in the aerial vehicle 129. The command may control the position, orientation, and zoom to set the aerial field of view 137. The mobile device 10 may also generate a command for the position, orientation, and/or zoom of the one or more cameras in the terrestrial vehicle 141 to set the ground field of view 135.

In addition or in the alternative, the command may describe the flight path for the aerial vehicle 129 to use. The command may provide individual directional commands to the aerial vehicle 129. The command may include position data describing the position of the terrestrial vehicle 141. The aerial vehicle 129 may be configured to follow the position of the terrestrial vehicle 141. The flight path may be designed to maintain a substantially constant distance between the aerial vehicle 129 and the terrestrial vehicle 141.

The flight command may instruct the aerial vehicle 129 to land on the terrestrial vehicle 141. For example, the mobile device 10 may receive data from a geographic database that a tunnel, overpass, or other obstruction is approaching. The aerial vehicle 129 may be secured to the terrestrial vehicle 141 by a magnetic landing pad or hook.

The commands may be sent from the mobile device 10 to the aerial vehicle 129 through a variety of techniques. For example, marker 142 may relay the command to the aerial vehicle. The marker 142 may be encoded with data for the command. The data 142 may be encoded as a quick response (AR) code, a universal product code (UPC), an alphanumeric code, a hexadecimal code, a binary code, a shape, or another code. The aerial vehicle 129 includes a camera or another imaging device to read and decode the marker 142. The camera may be the same or a different camera as the camera configured to collect images of the building facade 131.

Alternatively, the command may be transmitted from the mobile device 10 to the aerial vehicle 129 through direct or indirect radio communication. The direct radio communication may include wireless communication though protocols known as Wi-Fi, the protocols defined by the IEEE 802.11 standards, the protocols defined by the Bluetooth standards, or other protocols. The indirect radio communication may include signals or data packets through the network 127. The network 127 may include any combination of a cellular network, the Internet, or a local computer network.

The mobile device 11, the mobile device 10, or the server 125 may be configured to interpolate and/or stitch together images collected by cameras in the aerial vehicle 129 and images collected by cameras in the terrestrial vehicle 141. Both images may be panoramic images.

The images may be stitched together based on the content of the images. For example, common objects in one of the images may be aligned through image rectification or registration. Image rectification identifies lines of object outlines in the images and stretches or shrinks the two images to maximize the number of lines in the images that line up. The object outlines may be vertical (e.g., building edges) horizontal (e.g., road stripes or windows), or at other angles. Other techniques such as feature recognition, reverse image extraction, and multipoint distortion may be used to stitch the images together The images may be stitched together based on the marker 142. The shape and size of the marker 142 depends on the relative orientation and position of the aerial vehicle 129. For example, the smaller the marker 142 appears in images collected by the aerial vehicle 129, the farther away the marker 142, and the greater the distance between the aerial vehicle 129 and the field vehicle 141. Likewise, an angle of the marker 142 with respect to the aerial vehicle 129 depends on the orientation of the aerial vehicle 129. Through the angle and distance relating the aerial vehicle 129 and the field vehicle 129, the images may be aligned.

The images may be combined through interpolation. For example, after the images from the aerial vehicle 129 and the terrestrial vehicle 141 are aligned, corresponding pixels that overlap the two images are averaged or otherwise mathematically combined or adjusted. The pixels may be averaged in intensity, color, brightness or another attribute. Through interpolation, a single image at a single perspective is generated by the server 125 or the mobile device 11.

In one example, the two images are interpolated at with different weighting as a function of space. Portions of the images are given a weight that favors the images collected by the aerial vehicle 129 and portions of the images are given a weight that favors images collected by the terrestrial vehicle 141. For example, the weighting may vary according to elevation such that only images from the aerial vehicle 129 are used at a first height in the combined image and only images from the terrestrial vehicle 141 are used at a second height in the combined image. The first height is greater than the second height. In between the first height and the second height, portions of both images are used. The portions of the respective images may be a linear relationship such that the percentage weight for the images from the aerial vehicle 129 plus the percentage weight for the images from the terrestrial vehicle 141 equals a constant (e.g., 100%).

Figure 3:
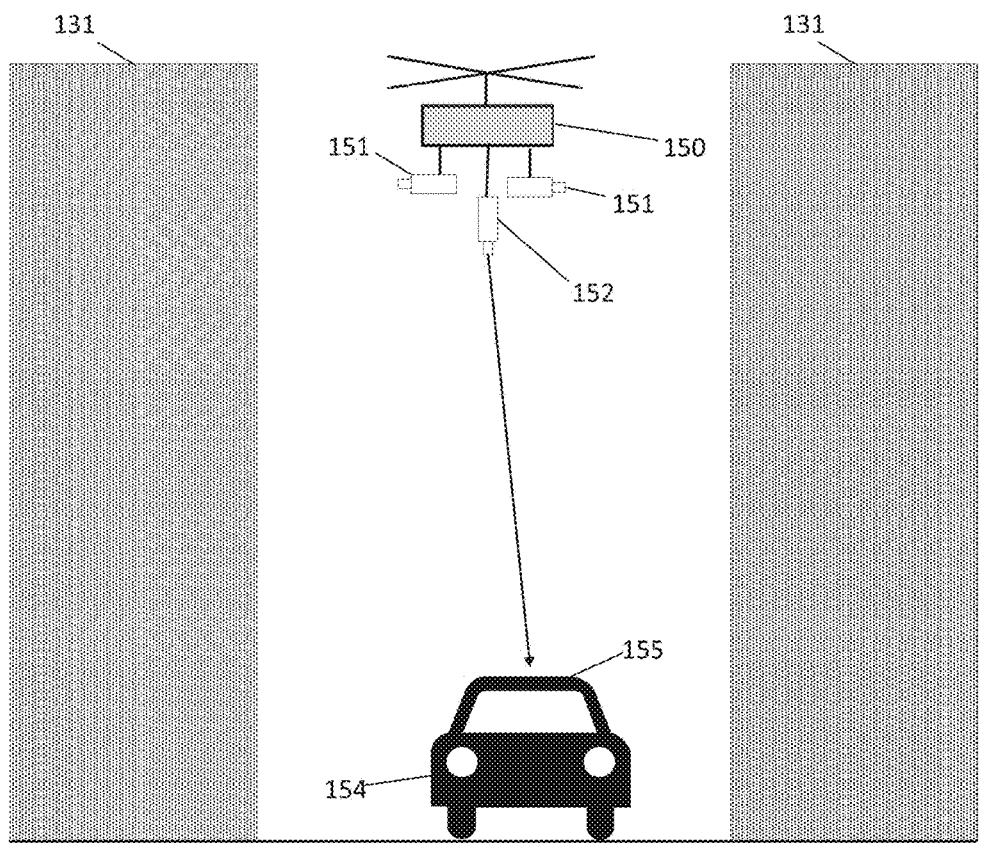
FIG. 3 illustrates another example guidance system for aerial image collection.

FIG. 3 illustrates another example guidance system for aerial image collection through collaboration between an aerial vehicle 150 and a terrestrial vehicle 141. The terrestrial vehicle 154 includes a tracking marker 155. The tracking marker 155 may be generated by an electronic display mounted on the roof of the terrestrial vehicle 154 and changed in time based on control by the mobile device 10. The tracking marker 155 may be painted on the terrestrial vehicle 154 or affixed to the terrestrial vehicle 154 as a sticker, magnetic sign, or decal. Alternatively, the tracking marker 155 may be a sign that is interchangeably installed into a guide or slot on the roof of the terrestrial vehicle 154 so that the signs may be easily removed and interchanged.

The aerial vehicle 150 may include horizontal cameras 151 and at least one vertical camera 152. The horizontal cameras 151 are configured to collect images of the building facades 131. The vertical camera 152 is configured to collect images of the tracking marker 155 and/or the terrestrial vehicle 154. The vertical camera 152 may be an infrared camera and the tracking marker 155 may include infrared paint. The vertical camera 152 may be a scanner or a low resolution camera configured to identify specific patterns or shapes. A single wide angle camera or rotatable camera may be used in places of the horizontal cameras 151 and the vertical camera 152.

The terrestrial vehicle 154 also includes one or more cameras to collect images of the building facade 131. Both sets of images may be sent to another location for processing by a computer. The computer may be configured to derive a three dimensional model. The computer may derive the relative positions of the aerial vehicle 150 and the terrestrial vehicle 154 using the size and shape of the tracking marker 155. The three dimensional model may be augmented using range data. The range data may be collected using a LIDAR device in one or both of the aerial vehicle 150 and the terrestrial vehicle 154. The LIDAR device is an optical sensor that detects distances of objects. The distances may be stored in a point cloud with each point includes a spatial position and/or intensity. The point cloud may be used to align objects in the multiple images collected by the aerial vehicle 150 and the terrestrial vehicle 154. The LIDAR point cloud provides three-dimensional positions for the objects in the images collected by the aerial vehicle 150 and the terrestrial vehicle 154. The mobile device 11 or the server 125 is configured to identify a common object in the images from the LIDAR point clouds. Based on the relative positions of the common object in the LIDAR point clouds, one of the images may be rotated and scaled to be aligned with the other images.

The images of the building facade 131 collected by the aerial vehicle 150 and the terrestrial vehicle 154 may be time coded. The time codes may include the time that the images are collected. A time differential may be calculated that indicates a distance between (e.g., a horizontal distance) the aerial vehicle 150 and the terrestrial vehicle 154. The time differential may be an amount of time that the aerial vehicle 150 is expected to travel the horizontal distance between the aerial vehicle 150 and the terrestrial vehicle 154. The server 125 may be configured to select images based on the time codes and may translate time codes from one set of images by adding or subtracting the corresponding time differential such that substantially aligned images are selected.

Figure 4A:
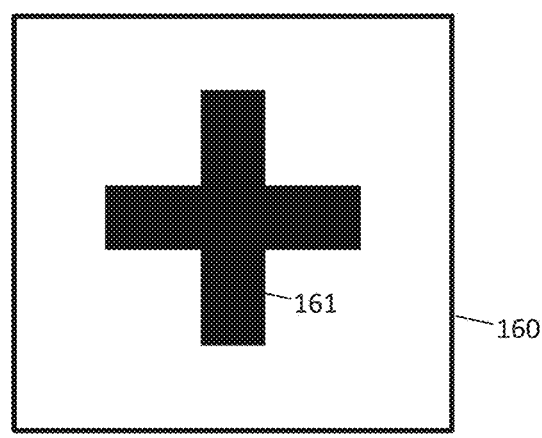
FIGS. 4A, 4B and 4C illustrate example markers for the guidance systems of FIGS. 2 and 3.

FIGS. 4A-C and 5A-C illustrate example markers for the guidance systems of FIGS. 2 and 3. FIG. 4A illustrates a marker 160 including a cross-pattern 161. The cross pattern includes horizontal and vertical lines. Angles between the horizontal lines and the vertical lines may be calculated through image processing by the mobile device 11, the mobile device 10, or the server 125. The relative dimensions of the cross pattern 171 may be measured by the mobile device 11, mobile device 10, or the server 125. The orientation of the cross pattern 171 based on the angles and relative dimensions may define the orientation of the terrestrial vehicle or the aerial vehicle. The orientation defines the spatial relationship between images collected at the terrestrial vehicle and images collected at the aerial vehicle.

Figure 4B:
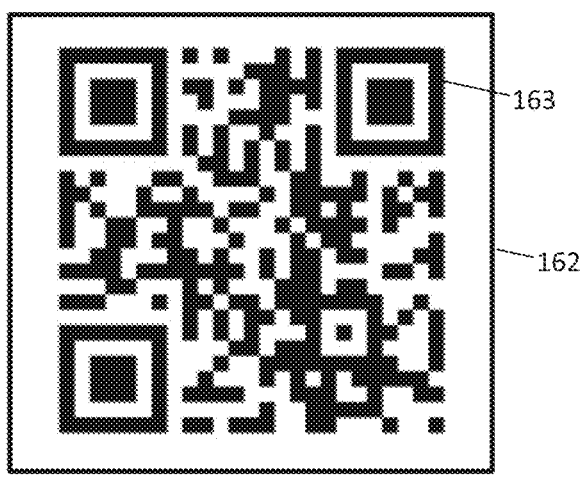

FIG. 4B illustrates a marker 162 including a QR code 163. The QR code 163 encodes data as a matrix barcode. The data may include a flight instruction for the aerial vehicle. The QR code may also be measured to determined angles and relative sizes to determine the orientation and spatial relationship of the terrestrial vehicle and the aerial vehicle.

Figure 4C:
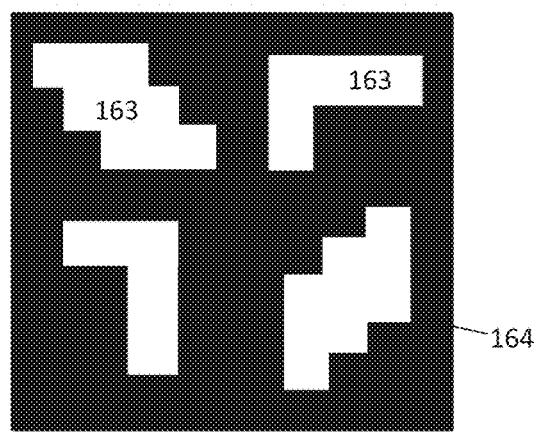

FIG. 4C illustrates a marker 164 including augmented reality shapes 163. The augmented reality shapes are basic shapes with easily measurable geometries. The shapes may correspond to specific instructions (e.g., speed up, slow down, turn left, turn right, or other commands). The specific instructions may include a flight path appropriate for a geographic position of the aerial vehicle (e.g., urban settings, rural settings, utility lines, tunnels, overpasses, or other potential interference) or environmental factors (e.g., weather, rain, sunshine, visibility, fog, light, darkness, time of day, season, or another factor). The reality shapes 163 may be a set of commands sequenced in time. For example, one of the shapes may convey a current flight operation of the aerial vehicle and the other shapes convey upcoming commands. The aerial vehicle may image all four commands to determine upcoming maneuvers. The shapes may rotate and disappear as time passes.

Figure 5A:
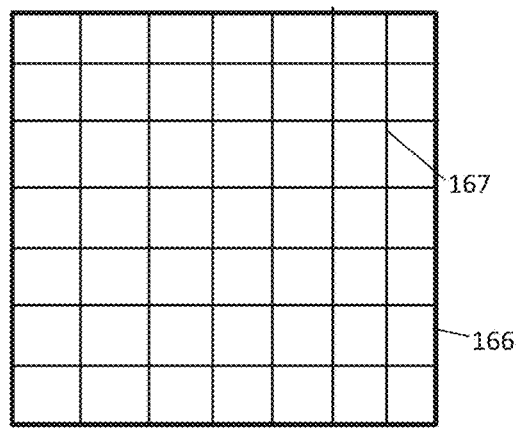
FIGS. 5A, 5B and 5C illustrate example markers for the guidance systems of FIGS. 2 and 3.
Figure 5B:
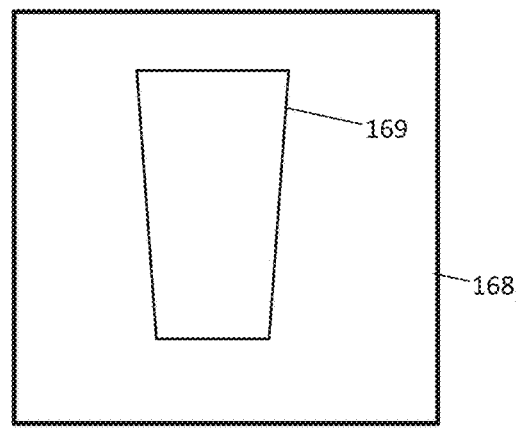
Figure 5C:
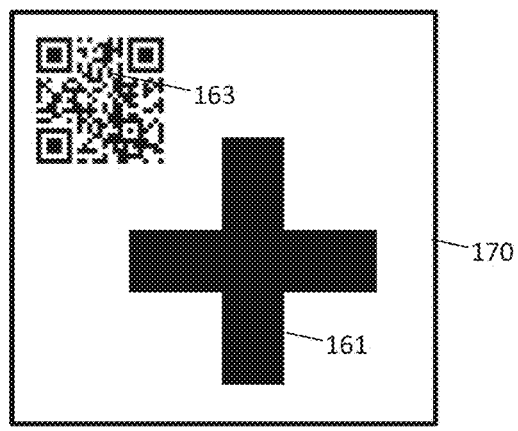

FIG. 5A illustrates a marker 166 including a grid 167. The grid 167 is made up of horizontal and vertical lines. The mobile device 11 or the server 125 is configured to process images of the grid 167 to calculate angles between the lines. FIG. 5B illustrates a marker 168 including a polygon 169. The polygon 169 is sized such that another shape appears when the aerial vehicle flies at a specific height and distance from the terrestrial vehicle. For example, the polygon 169 shown in FIG. 5B may appear as a rectangle in an image collected at the aerial vehicle when the aerial vehicle is at the specified height and distance from the terrestrial vehicle. FIG. 5C illustrates a marker 170 including a plurality of shapes. The marker 170 may include a QR code 163 defining a flight command and a shape 161 for measuring the relative distance and orientation between vehicles. In one example, the marker includes an AR code at the corners (e.g., four corners).

Figure 6:
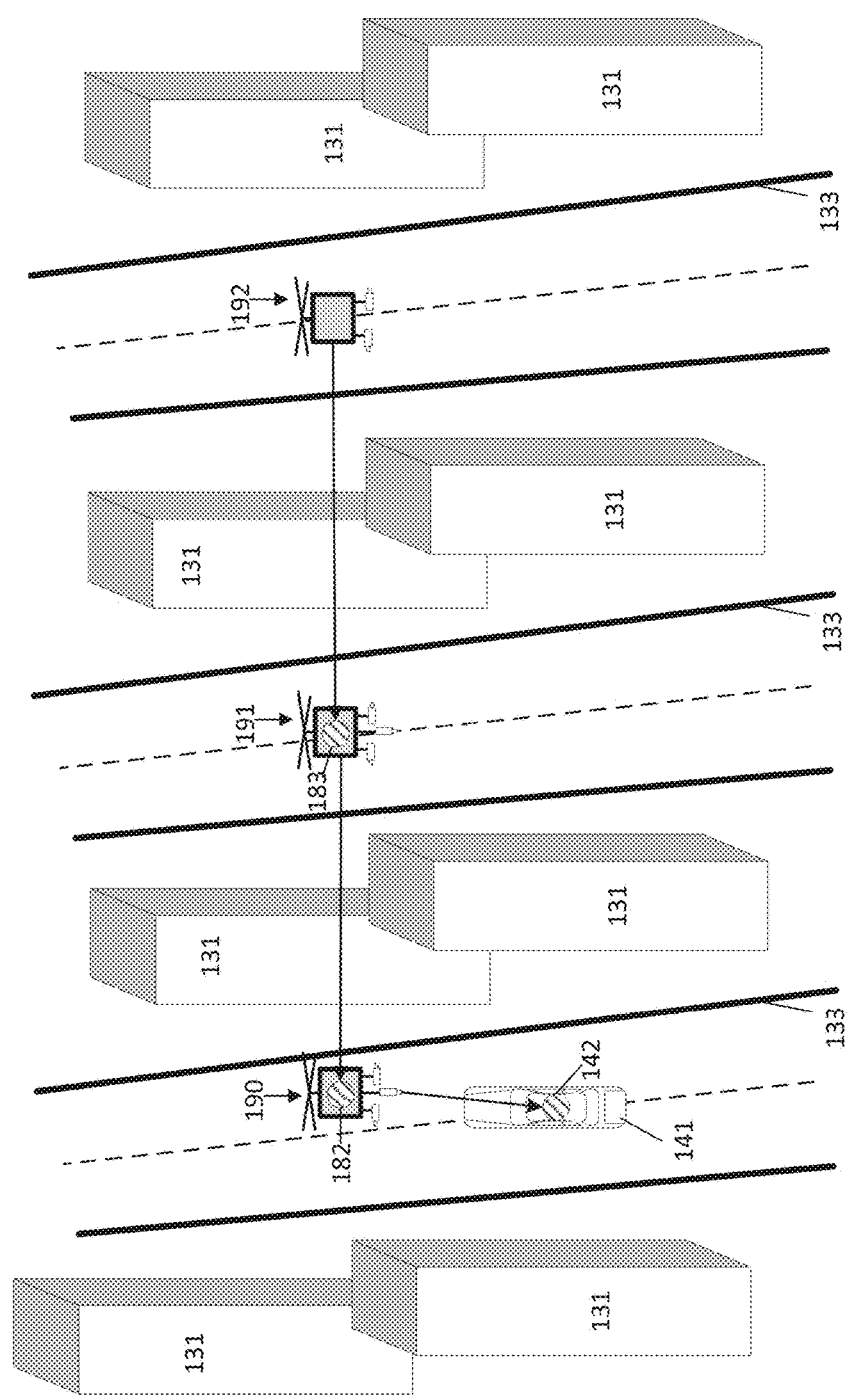
FIG. 6 illustrates another example guidance system for aerial image collection.

FIG. 6 illustrates another example guidance system for aerial image collection. The terrestrial vehicle 141 is in communication with multiple aerial vehicles such that multiple roads 133 are imaged simultaneously. A first aerial vehicle 190 is configured to track the marker 142 on the terrestrial vehicle 141. A second aerial vehicle 191 is configured to track an aerial vehicle marker 182 on the first aerial vehicle 190. Optionally, a third aerial vehicle 192 is configured to track another aerial vehicle marker 183 on the second aerial vehicle 191. The second aerial vehicle 191 and the third aerial vehicle 192 may track and detect orientation using any of the implementations discussed above. In addition, the aerial vehicle 190 may receive commands intended for the second aerial vehicle 191 from the marker 142 and relay the commands using the aerial vehicle marker 182. The aerial markers 182 and 183 may be constant (e.g., signs) or variable (e.g., electronic display). The second aerial vehicle 191 and the third aerial vehicle 192 may omit horizontal cameras and/or aerial markers. In other embodiments, the multiple aerial vehicles track a common marker or different markers on a common vehicle (e.g., terrestrial vehicle). Wireless communications may be used to guide the multiple aerial vehicles in yet other embodiments.

Figure 7:
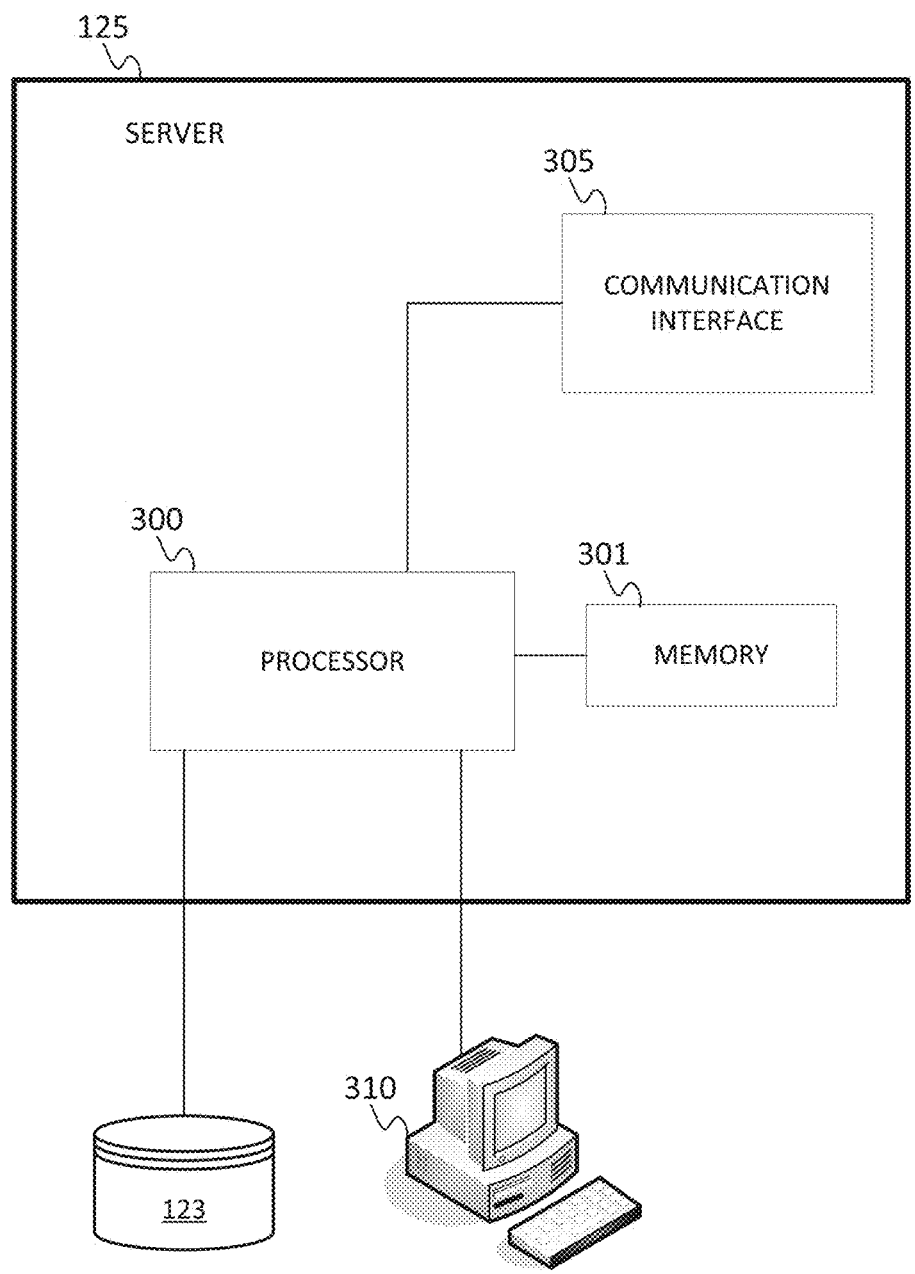
FIG. 7 illustrates an exemplary server of the system of FIG. 1.

FIG. 7 illustrates an exemplary server of the system of FIG. 1. The server 125 includes a processor 300, a communication interface 305, and a memory 301. The server 125 may be coupled to a database 123 and a workstation 310. The workstation 310 may be used as an input device for the server 125. In addition, the communication interface 305 is an input device for the server 125. The communication interface 305 receives data indicative of use inputs made via the workstation 310 or the mobile devices 10 or 11.

The communication interface 305 is also configured to receive image data from mobile device 10 associated with the terrestrial vehicle 141 and image data from the mobile device 11 associated with the aerial vehicle 129. The communication may be through a direct connection or through network 127.

The processor 300, which may be any type of controller, is configured to calculate a spatial relationship between the terrestrial vehicle and the aerial vehicle based on the image data from the mobile device 11. The image data from the mobile device 11 includes a stored predetermined shape. The processor 300 analyzes the shape to determine how far the shape was from the aerial vehicle 129 when the image was taken. The processor 300 also analyzes the shape to determine an orientation and/or spatial relationship of the aerial vehicle 129 with respect to the terrestrial vehicle 141.

The processor 300 is configured to combine the image data collected by the aerial vehicle 129 and the image data collected by the terrestrial vehicle 141 according to the orientation and/or spatial relationship between the terrestrial vehicle and the aerial vehicle. The processor 300 may be configured to translate, rotate, and scale one image to the three dimensional frame of reference of the other image so that the images can be stitched or spliced together. The processor 300 may also be configured to identify a registration object or registration line in the images, and translate, rotate, or scale one of the image based on the registration object or registration line in order to align the images.

The processor 300 may also be configured to analyze the image data collected by the aerial vehicle 129 to identify a flight command for the aerial vehicle 129. The processor 300 identifies the flight command and sends the command to the mobile device 11 through radio communication. The flight command may include a height, a speed, or a turn for the aerial vehicle 129. The flight command may instruct the aerial vehicle 129 to land on the terrestrial vehicle 141.

Figure 8:
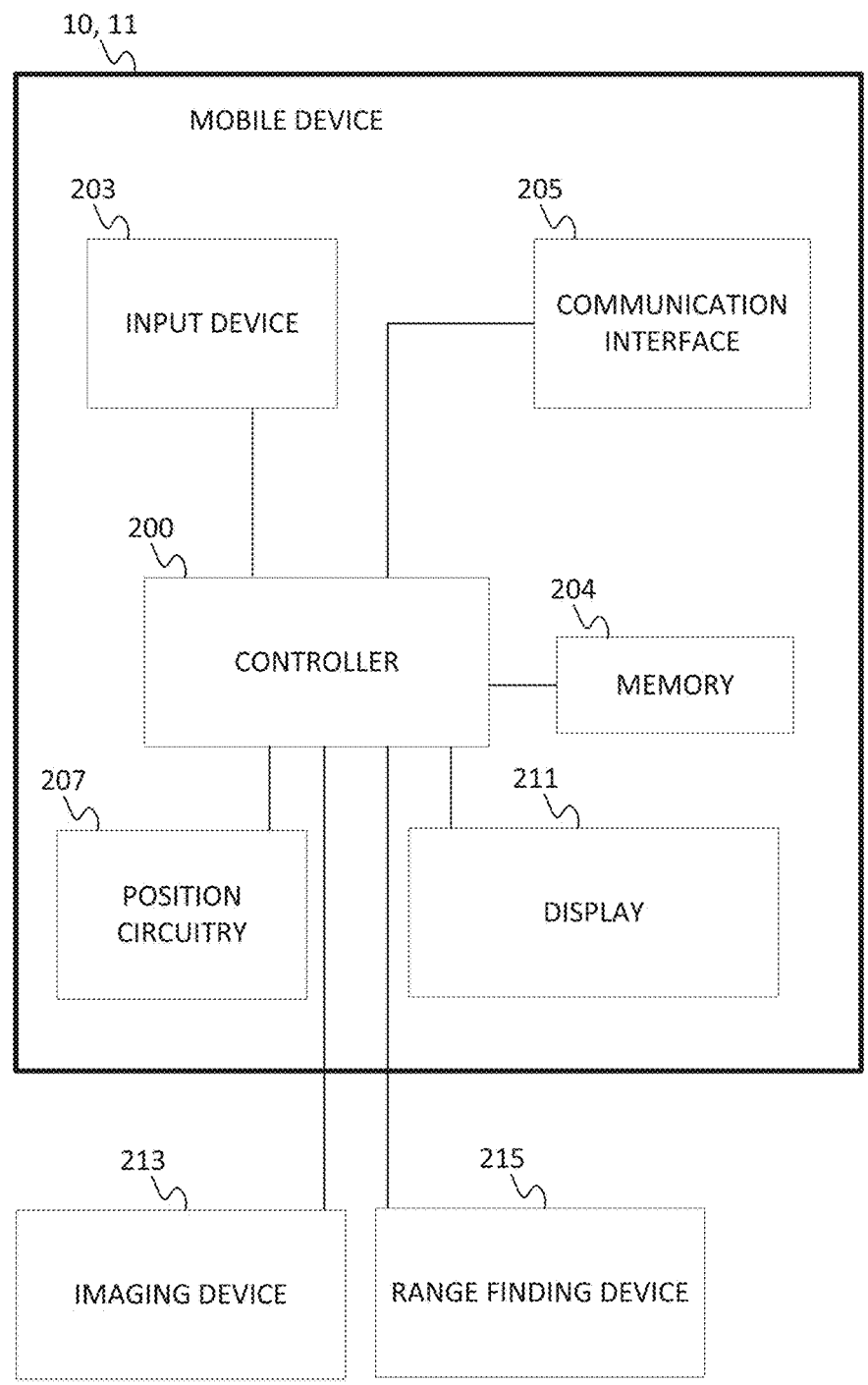
FIG. 8 illustrates an exemplary mobile device of the system of FIG. 1.
Figure 9:
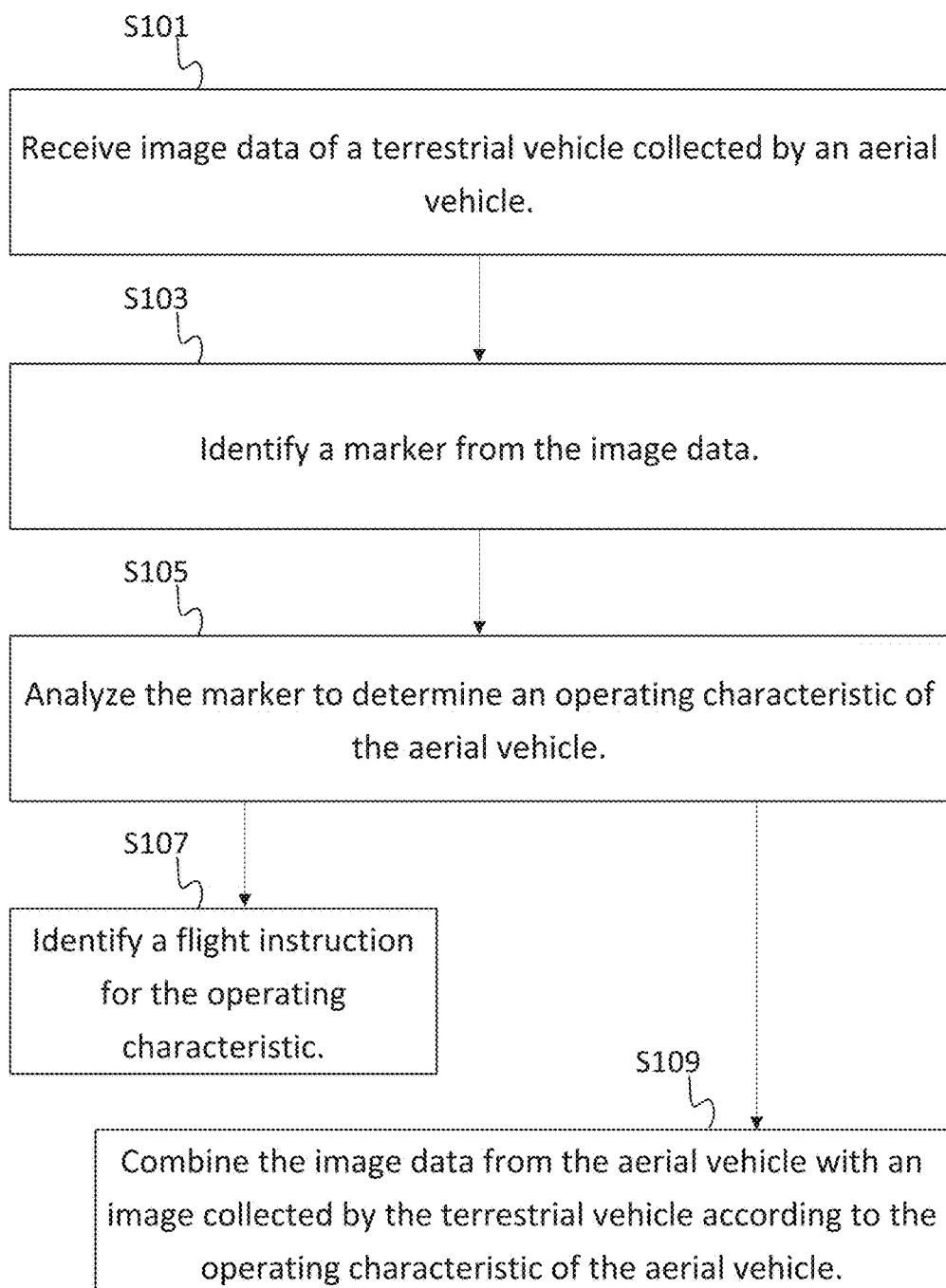
FIG. 9 illustrates an example flowchart for aerial image collection.

FIG. 8 illustrates an exemplary mobile device of the system of FIG. 1. The mobile device 10 or 11 includes a controller 200, a memory 204, an input device 203, a communication interface 205, position circuitry 207, an imaging device 213, and a display 211. Optionally, a range finding device 215 is coupled to or integrated with the mobile device 10 or 11. In the following endpoint-based embodiments, the mobile device 10 or 11 performs a majority of the processing. FIG. 9 illustrates an example flowchart for aerial image collection and processing, which is described in relation to the mobile device 10 or 11 but may be performed by another device. Additional, different, or fewer acts may be provided.

At act S101, the controller 205 is configured receive image data of a terrestrial vehicle collected by an aerial vehicle. The image data may also depict the surrounding buildings and other objects. The image data may be received directly from the imaging device 213 or from memory 204.

At act S103, the controller 205 is configured to identify a marker from the image data. The marker may be an image of a physical mark on the terrestrial vehicle. The marker may be encoded with information. The marker may be a predetermined shape such that the controller 205 is configured to compare the captured image of the marker to a template. Based on the comparison, the controller 205 may identify changes in the marker and/or the orientation in the marker.

At act S105, the controller 205 is configured to analyze the marker to determine an operating characteristic of the aerial vehicle. As shown at act S107, the operating characteristic may be a flight instruction for the aerial vehicle. For example, the marker may instruct the aerial vehicle to fly at a specific altitude, at a specific distance from the terrestrial vehicle, or at a specific speed. The marker may instruct the vehicle to turn right, turn left, fly under a tunnel, or fly over an overpass.

The operating characteristic may be the orientation of the aerial vehicle or camera. The controller 205 may be configured to analyze the marker to determine the spatial relationship between the aerial vehicle and the terrestrial vehicle and/or the orientation of the aerial vehicle. As shown as act S109, the controller 205 may be configured to combine the image data from the aerial vehicle with an image collected by the terrestrial vehicle (or previously collected in any fashion) according to the spatial relationship and/or orientation of the aerial vehicle. Acts S107 and S109 may be performed in succession, simultaneously, or in the alternative. The processor 300 of the server 125 may perform one or more of acts S101 through S109.

The imaging device 213 may include a single camera or an array of cameras. The array of cameras may be arranged to provide a 360 degree field of view. The image device 213 may additionally include a low resolution camera or scanner for imaging the marker.

The range finding device 215 may be an optical ranging device configured to send a laser or other signal and receive the signal back after the signal reflects off objects. The range finding device 215 generates distance data or point cloud data of position based on the timing of the reflected signal. The data may be referred to as depth map. The range finding device 215 may be a LIDAR sensor. The LIDAR sensor may generate binary data (e.g., on or off). An intensity value may be included in place of the on or off value. Alternatively, the data points may include a distance value and two angle values to signify a location of a point in the point cloud. The point cloud may be stored in ASCII or LIDAR exchange format. One or more lasers of the LIDAR device may be in a near infrared spectrum (such as about 700 nm to about 5000 nm or about 800 nm to about 2500 nm) or another light spectrum.

The input device 203 is configured to receive a selection for manually entering flight commands for the aerial vehicle. The input may include a distance between vehicles or a target altitude for the aerial vehicle. The input may instruct an angle for the cameras of either vehicle or an amount of overlap for the cameras. The input device 203 may be one or more buttons, keypad, keyboard, mouse, stylist pen, trackball, rocker switch, touch pad, voice recognition circuit, or other device or component for inputting data to the mobile device 10 or 11. The input device 203 and the display 211 may be combined as a touch screen, which may be capacitive or resistive. The display 211 may be a liquid crystal display (LCD) panel, light emitting diode (LED) screen, thin film transistor screen, or another type of display. Alternatively, the display 211 of the mobile device 10 may be mounted on the terrestrial vehicle or viewable through a window of the terrestrial vehicle. The display 211 may be configured to display the markers described above.

The positioning circuitry 207 is optional and may be excluded for map-related functions. The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 10 or 11. The positioning system may also include a receiver and correlation chip to obtain a GPS signal. Alternatively or additionally, the one or more detectors or sensors may include an accelerometer built or embedded into or within the interior of the mobile device 10 or 11. The accelerometer is operable to detect, recognize, or measure the rate of change of translational and/or rotational movement of the mobile device 10 or 11. The mobile device 10 or 11 receives location data from the positioning system. The location data indicates the location of the mobile device 10 or 11. Location data may be used for guiding the aerial vehicle rather than or in addition to the marker.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the mobile device 10 or 11, such as a secure digital (SD) memory card.

The memory 204, the memory 301, or database 123 may be a geographic database. The geographic database may be used to guide the terrestrial vehicle and predict upcoming maneuvers of the terrestrial vehicle. Position data in the geographic database may be used to index the images collected by the terrestrial vehicle and the aerial vehicle. The geographic database 123 includes information about one or more geographic regions. Each road in the geographic region is composed of one or more road segments. A road segment represents a portion of the road. Each road segment is associated with two nodes (e.g., one node represents the point at one end of the road segment and the other node represents the point at the other end of the road segment). The node at either end of a road segment may correspond to a location at which the road meets another road, i.e., an intersection, or where the road dead-ends. The road segment data record may include data that indicate a speed limit or speed category (i.e., the maximum permitted vehicular speed of travel) on the represented road segment. The road segment data record may also include data that indicate a classification, such as a rank of a road segment that may correspond to its functional class. The road segment data may include data identifying what turn restrictions exist at each of the nodes which correspond to intersections at the ends of the road portion represented by the road segment, the name or names by which the represented road segment is known, the length of the road segment, the grade of the road segment, the street address ranges along the represented road segment, the permitted direction of vehicular travel on the represented road segment, whether the represented road segment is part of a controlled access road (such as an expressway), a ramp to a controlled access road, a bridge, a tunnel, a toll road, a ferry, and so on. Further, the represented road segment may include data indicative of the positions of tunnels, overpasses or other obstacles.

Navigation-related features, including a route calculation application, may display the street side images generated in the above embodiments. End users may access a route from an origin to a destination. The route calculation application determines the route for the end user to travel along the road segments to reach the desired destination. In order to calculate a route, the route calculation application is provided with data identifying a starting location (origin) and a desired destination location. In one embodiment, the starting location may be the end user's current position and the destination may be entered by the end user. Given at least the identification of the starting location (origin) and the desired destination location, the route calculation application determines one or more solution routes between the starting location and the destination location. A solution route is formed of a series of connected road segments over which the end user can travel from the starting location to the destination location. When the route calculation application calculates a route, the application accesses the geographic database 123 and obtains data that represent road segments around and between the starting location and the destination location. The road calculation application uses the data to determine at least one valid solution route from the starting location to the destination location. The at least one valid solution route may be displayed to the user in the rendering of the geographic region such that addresses or points of interest along the route may be selected to display street side imagery.

In one embodiment, the route calculation application may attempt to find a solution route that takes the least time to travel. The segment cost or travel time for the particular represented road segment considers the type of road, such as freeway or residential street, speed limit and distance of the segment. In one embodiment, the route calculation application may consider traffic conditions to more accurately reflect actual travel time over the connected road segments. When the route calculation application determines one or more solution routes comprising the series of connected road segments, the travel times for each of the included connected road segments is summed to provide an estimated route travel time. Based on the route travel time, the route calculation application selects the quickest route. Once the route calculation application has selected the route, the route calculation application provides an output in the form of an ordered list identifying a plurality of road segments that form the continuous navigable route between the origin and the destination. In addition, the route calculation program provides an output of an estimated route travel time.

Map-related features may also display the street side imagery generated in the embodiments above. The map-related features may be any of the navigation-related features provided to the user without reference to the current location of the user or the device. In addition, map-related features may include display and manipulation of a map of a geographic region. The map-related features may be provided without navigation-related features.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

The memory 401 and/or memory 204 are a non-transitory computer-readable medium configured to store instructions for any of the implementation discussed above. While the non-transitory computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method for building a model through cooperation of movement of an aerial vehicle and a terrestrial vehicle, the method comprising:
   receiving location data for a mobile device associated with the aerial vehicle or the terrestrial vehicle;
   receiving a first image collected by the aerial vehicle;
   receiving a second image collected by the terrestrial vehicle;
   storing the first image and the second image in a geographic database;
   determining a spatial relationship between the aerial vehicle and the terrestrial vehicle;
   deriving the model from a combination of the first image and the second image and the spatial relationship between the aerial vehicle and the terrestrial vehicle from the cooperation of movement of the aerial vehicle and the terrestrial vehicle; and
   indexing, by a processor, the model from the combination of the first image and the second image in the geographic database based on the location data and the spatial relationship between the aerial vehicle and the terrestrial vehicle.

2. The method of claim 1, wherein the first image and the second image are combined based on an orientation of the aerial vehicle.

3. The method of claim 1, further comprising:
   receiving first range data collected at the aerial vehicle and second range data collected at the terrestrial vehicle, wherein the combined image is based on the first range data and the second range data.

4. The method of claim 1, wherein a first height portion of the combined image is derived from the first image and a second height portion of the combined image is derived from the second image.

5. The method of claim 4, wherein between the first height portion and the second height portion the combined image is derived from both the first image and the second image.

6. The method of claim 1, further comprising:
   interpolating the first image from the aerial vehicle and the second image from the terrestrial vehicle to generate a single image from a single perspective.

7. The method of claim 1, wherein the first image collected by the aerial vehicle depicts the terrestrial vehicle and the aerial vehicle tracks the terrestrial vehicle.

8. The method of claim 1, wherein the first image includes a first portion of a building façade and the second image includes a second portion of a building façade.

9. An apparatus for building a model through cooperation of movement of an aerial vehicle and a terrestrial vehicle, the apparatus comprising:
   at least one processor; and
   at least one memory including computer program code, the at least one memory and the computer program code configured to, with the at least one processor, cause the apparatus at least to:
   receive location data for a mobile device associated with the aerial vehicle or the terrestrial vehicle;
   receive a first image collected by the aerial vehicle;
   receive a second image collected by the terrestrial vehicle, wherein the aerial vehicle tracks and follows movement of the terrestrial vehicle;
   determine a spatial relationship between the aerial vehicle and the terrestrial vehicle;
   derive the model from a combination of the first image and the second image and the spatial relationship between the aerial vehicle and the terrestrial vehicle from the cooperation of movement of the aerial vehicle and the terrestrial vehicle; and
   index the model from the combination of the first image and the second image in a geographic database based on the location data.

10. The apparatus of claim 9, wherein the first image and the second image are combined based on an orientation of the aerial vehicle.

11. The apparatus of claim 9, the at least one memory and the computer program code configured to, with the at least one processor, cause the apparatus at least to:
   receive first range data collected by the aerial vehicle and second range data collected by the terrestrial vehicle, wherein the combined image is based on the first range data and the second range data.

12. The apparatus of claim 9, wherein a first height portion of the combined image is derived from the first image and a second height portion of the combined image is derived from the second image.

13. The apparatus of claim 12, wherein between the first height portion and the second height portion, the combined image is derived from both the first image and the second image.

14. The apparatus of claim 9, the at least one memory and the computer program code configured to, with the at least one processor, cause the apparatus at least to:
   interpolate the first image from the aerial vehicle and the second image from the terrestrial vehicle to generate a single image from a single perspective.

15. The apparatus of claim 9, wherein the first image collected by the aerial vehicle depicts the terrestrial vehicle.

16. The apparatus of claim 9, wherein the first image includes a first portion of a building façade and the second image includes a second portion of a building façade.

17. A non-transitory computer readable medium including instructions that when executed are operable to:
   receive location data for a mobile device associated with an aerial vehicle or a terrestrial vehicle;
   receive a first image collected by the aerial vehicle;
   receive a second image collected by the terrestrial vehicle, wherein the first image includes a first portion of a building façade and the second image includes a second portion of the building façade;
   deriving a model of the building façade from a combination of the first image and the second image from cooperation of movement of the aerial vehicle and the terrestrial vehicle;
   store the model of the building façade from the combination of the first image and the second image in a geographic database; and
   index the model of the building façade in the first image and the second image in the geographic database based on the location data.

18. The non-transitory computer readable medium of claim 17, including instructions that when executed are operable to:
   identify a first time code of the first image;
   identify a second time code of the second image; and
   determine a time differential for a distance between the first image and the second image, wherein the first image and the second image are indexed in the geographic database based on the time differential.

* * * * *